L. F. GOODSPEED.
CHEMICAL TANK.
APPLICATION FILED FEB. 17, 1912.
1,114,876.
Patented Oct. 27, 1914.
2 SHEETS—SHEET 1.
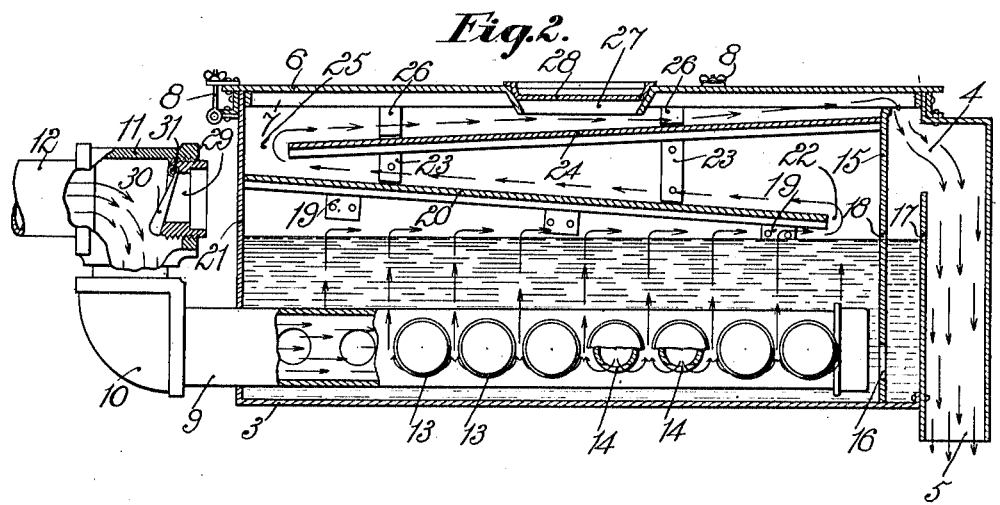
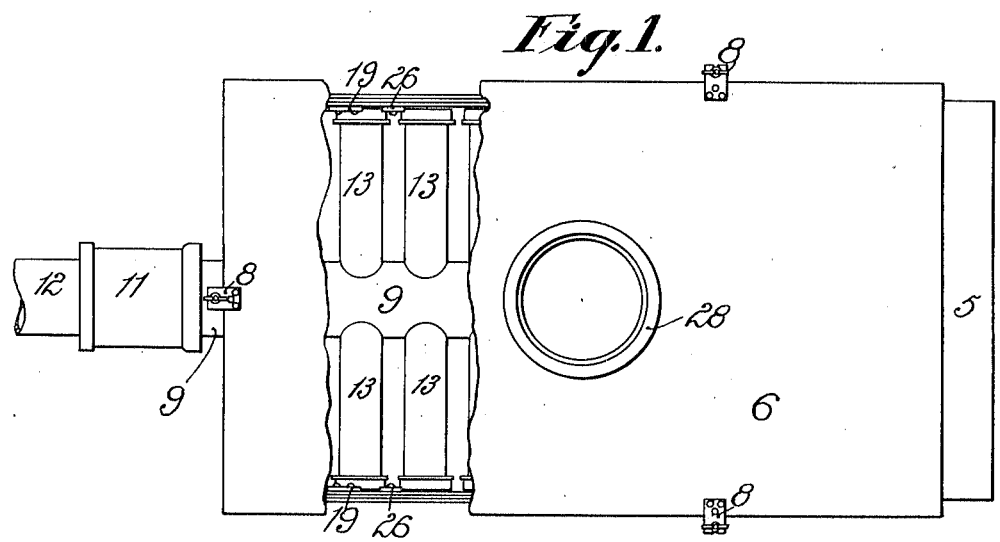
Witnesses:
Robert F. Brache
Leonard W. Novander
Inventor
Leland F. Goodspeed
By Brown & Williams
Attorneys

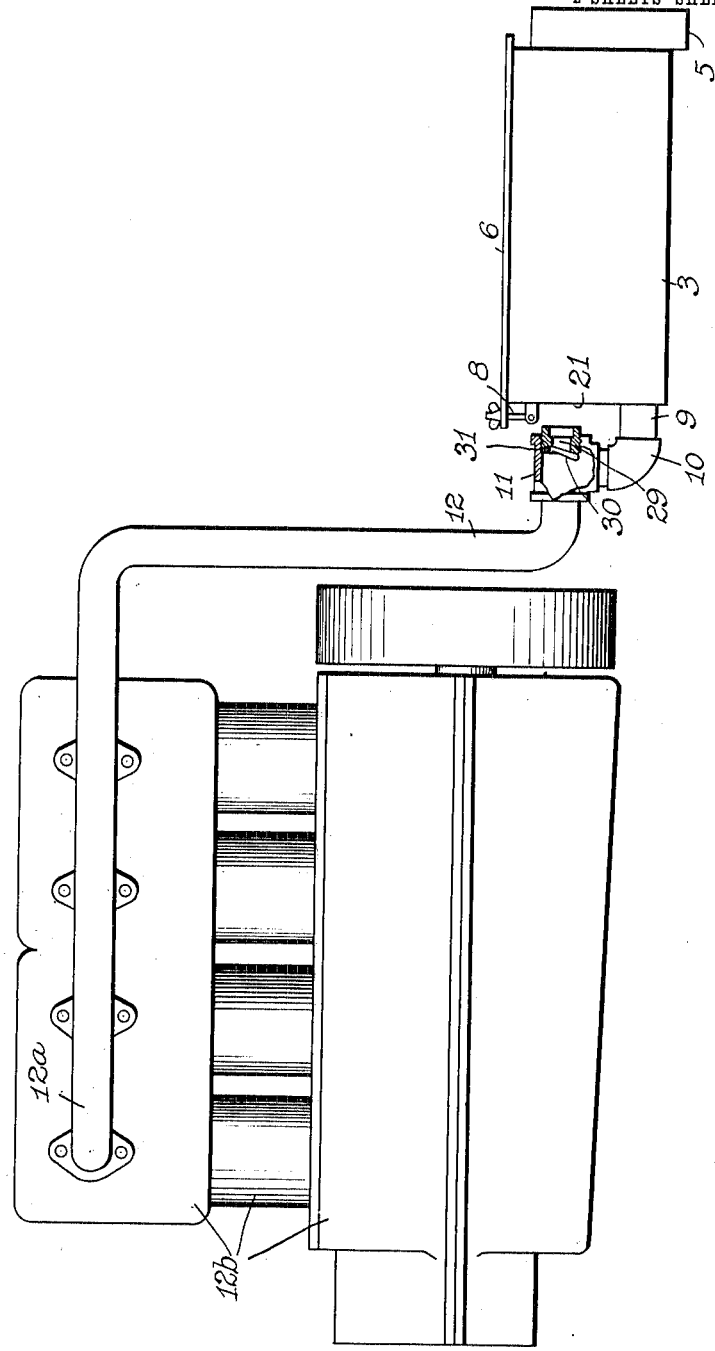

UNITED STATES PATENT OFFICE.

LELAND F. GOODSPEED, OF MILWAUKEE, WISCONSIN, ASSIGNOR TO MILWAUKEE LOCOMOTIVE MANUFACTURING COMPANY, OF MILWAUKEE, WISCONSIN, A CORPORATION OF WISCONSIN.

CHEMICAL-TANK.

1,114,876.  Specification of Letters Patent.  Patented Oct. 27, 1914.

Application filed February 17, 1912. Serial No. 678,322.

*To all whom it may concern:*

Be it known that I, LELAND F. GOODSPEED, a citizen of the United States, residing at Wilwaukee, in the county of Milwaukee and State of Wisconsin, have invented a certain new and useful Improvement in Chemical-Tanks, of which the following is a full, clear, concise, and exact description, reference being had to the accompanying drawings, forming a part of this specification.

My invention relates to tanks in which chemical reactions may take place, and it is my object to provide an apparatus which can be used effectively for treating gases with a liquid.

Specifically, my invention is concerned with a chemical tank which can be used in connection with internal combustion engines for dissipating the exhaust gases or for treating them so as to render them harmless as will be pointed out. When internal combustion engines are employed in mines and similar places where gases permeate the atmosphere, as is the case where gasolene locomotives are used in such places for hauling purposes, it is desirable to treat exhaust gases to render them harmless, for instance by means of a lime solution before they are passed off into the atmosphere.

My invention contemplates a novel and improved structure for this purpose, and is effective in the manner in which it physically manipulates the gases to the desired end. Furthermore, certain features of the apparatus are peculiarly adaptable to association with internal combustion engines, and I make these features the subject matter of some of the more limited of the appended claims.

Broadly speaking, my apparatus is in the form of a box in the bottom of which certain gas distributing apparatus is disposed. The box is adapted to be filled up above a certain level of this gas distributing apparatus with the chemical solution, and above the determined level of the solution a system of baffling is provided, the gases being finally passed off in a simple manner. I provide means whereby the solution may be held against back pressure in the engine, and this I regard as one of the features peculiarly adapted for the specific purposes set forth.

My invention is illustrated in the accompanying drawings, in which,—

Figure 1 is a plan view of the apparatus, parts being broken away to reveal the interior construction; and Fig. 2 is a longitudinal central sectional view thereof. Fig. 3 illustrates the attachment of the tank to an internal combustion engine.

Like characters are applied to the same parts thereof.

The box here shown at 3 is rectangular in shape and at one end, near the top, it is provided with an outlet 4, this outlet being supplemented by a downwardly extending casing or conduit 5 opening at the bottom. The top of the tank is closed by means of a cover 6, having a downwardly extending ridge 7, which fits snugly inside the box, and this cover is clamped in place by means of clamping means 8, 8.

Inside the tank at the bottom, the pipe 9 extends longitudinally and centrally from end to end, being extended out of the tank at one end and there provided with a coupling 10, which joins it to a valve box 11, forming a pipe 12 extending therefrom and to the source of the gas, such as the exhaust manifold $12^a$ of an internal combustion engine $12^b$, as illustrated in Fig. 3. The pipe 9 has on either side thereof a series of laterally extending pipes 13—13, which thus lie horizontally near the bottom of the tank, the axes of all these pipes and the axis of the pipe 9 all lying in a common horizontal plane. The laterally extending pipes are each provided with a series of slits 14—14 on the under side thereof for a purpose which will be pointed out presently. Near the exit end of the tank a vertical wall 15 is provided, and this wall is provided with an opening 16 which permits of the free circulation of the solution.

The level of the liquid is determined by an opening 17 in the wall of the box at the exit end, corresponding opening 18 being provided in the wall 15. Above the level of the liquid, the side walls of the box are provided with inwardly extending brackets 19—19, upon which a baffle plate 20 is disposed. The brackets are such that the baffle plate will be held in a slightly inclined position, rising toward the entrance end of the tank and is also so disposed that it touches the wall 21 at the entrance end of the box and is spaced away from the wall 15 at the other end, thus leaving a passage 22. Above the baffle plate 20 on each of the side walls are secured the brackets 23—23, which not only hold the baffle plate 20 in place but also act to support the baffle plate 24, which touches the wall 15, but is spaced away from the wall 21 to leave the passageway 25 at the entrance end of the box. This baffle plate 24 is held in place by means of the lugs 26—26, which are immediately carried by the cover 6. The cover 6 is also provided with an opening 27, having a closure 28, and the chemical may be introduced through this opening. The particular manner in which the brackets are secured in place is unimportant so long as they maintain the baffles in position.

The valve casing 11 is provided with a side port 29, which is normally closed by means of a flap valve 30 hung upon a pivot 31, and it will appear that if there is a reversal of the exhaust gases to the engine, this valve will respond to admit air, since it is the path of least resistance, instead of drawing the solution in the tank back to the engine. The gas coming in at the pipe 12 from the internal combustion engine 12$^b$ takes the course indicated by the arrows passing down through the pipe 9, through the pipes 13—13 out through the slits 14—14, up through the chemical solution, then directed to the passage way 22, by the baffle 20, then directed to the passageway 25 by the baffle 24 and then directed to the outlet 4 by the cover 6. The gas then passes out through the casing 5 to the atmosphere.

The side port 29 may be located anywhere in the wall of the connecting medium between the exhaust manifold 12$^a$, and the tank, so long as it is above the level of the liquid in the tank, and it will be understood that by "side port", I mean a port in the wall of the pipe or connection so that the valve controlling it governs the entry of outside air and does not control the pipe passage itself.

I claim as new and desire to secure by Letters Patent:

1. In combination with an internal combustion engine, a chemical tank comprising a casing, a pipe to convey the exhaust gases from the engine to said casing below the level of liquid therein, a side port in said pipe above the level of the liquid, and an inwardly-opening suction-operated valve controlling said side port and arranged to respond to a reverse flow of the exhaust gases.

2. In combination with an internal combustion engine, a chemical tank comprising a casing, a pipe to convey the exhaust gases from the engine to said casing below the level of liquid therein, a side port in said pipe above the level of the liquid, and a normally-closed inwardly-opening suction-operated valve controlling said side port and arranged to respond to a reverse flow of the exhaust gases.

3. In combination with an internal combustion engine, a chemical tank comprising a casing, a system of perforated pipes in the bottom of said casing below the level of liquid therein and an outlet at one end thereof, a pipe to convey the exhaust gases from the engine to the perforated pipes in the chemical tank, an inwardly-opening valve in said pipe and a solution in said chemical tank through which the exhaust gases pass before they escape to the atmosphere.

4. A chemical tank comprising a casing, an inlet pipe to carry gases to be treated to the tank entering at the bottom of said casing, a system of perforated pipes in the bottom of said casing below the level of liquid therein, and connected to the inlet pipe, and a valve in said inlet pipe adapted to admit air to said pipe if the pressure in said pipe should drop below atmospheric pressure.

5. A chemical tank comprising a casing, an inlet pipe entering from the outside of said casing at the bottom thereof, a suction-operated valve for the admission of air in said inlet pipe, a system of perforated pipes in the bottom of the casing below the level of liquid therein and connected with said pipe, baffle plates at the top of the casing, and an outlet for said casing.

In witness whereof, I hereunto subscribe my name this 15th day of February, A. D., 1912.

LELAND F. GOODSPEED.

Witnesses:
 HARVEY L. HANSON,
 LEONARD E. BOGUE.